(12) United States Patent
Bastian

(10) Patent No.: US 6,240,357 B1
(45) Date of Patent: May 29, 2001

(54) METHOD AND ARRANGEMENT FOR CONTROLLING VEHICLE SPACING

(75) Inventor: Andreas Bastian, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/136,741

(22) Filed: Aug. 19, 1998

(30) Foreign Application Priority Data

Aug. 23, 1997 (DE) ............................................. 197 36 756

(51) Int. Cl.⁷ ...................................................... G06F 7/00
(52) U.S. Cl. ............................ 701/96; 180/169; 180/179; 701/98
(58) Field of Search .................................. 701/36, 71, 70, 701/74, 80, 117, 93, 96, 98, 300, 301; 180/167, 169, 170, 178, 179; 340/903, 905, 936, 435, 436, 463; 307/10.1; 303/121, 125

(56) References Cited

U.S. PATENT DOCUMENTS

| | | | |
|---|---|---|---|
| 4,706,195 | 11/1987 | Yoshino et al. | 701/96 |
| 5,014,200 | 5/1991 | Chaundrlik et al. | 701/96 |
| 5,278,764 * | 1/1994 | Iizuka et al. | 701/301 |
| 5,375,060 | 12/1994 | Nöcker | 701/301 |
| 5,749,426 * | 5/1998 | Gilling | 180/167 |
| 5,904,215 * | 5/1999 | Ikeda | 180/169 |
| 5,969,640 * | 10/1999 | Timm et al. | 340/903 |
| 6,044,321 * | 3/2000 | Nakamura et al. | 701/96 |

FOREIGN PATENT DOCUMENTS

| | | |
|---|---|---|
| 4209060 | 12/1994 | (DE) . |
| 19510910 | 9/1995 | (DE) . |
| 19535623 | 4/1996 | (DE) . |
| 19543551 | 5/1996 | (DE) . |
| 4437678 | 6/1996 | (DE) . |
| 19523111 | 2/1997 | (DE) . |
| 19509178 | 6/1997 | (DE) . |
| 0813988 | 12/1997 | (EP) . |

OTHER PUBLICATIONS

Protzel, P. et al., Abstandregelung von Fahrzeugen mit Fuzzy Control, Fuzzy Logic. Theorie and Praxis. Dordmunder Fuzzy–Tage, 7. Juni 1993, Seiten 212–221, XP000645972.

"Modellgestützte Verfahren zur parameteradaptiven Regelung der Fahrzeuglängsdynamik" by Germann et al. pp. 84–92. Automatisierungstechnik 45 (1997).

"Autonome Intelligente Geschwindigkeitsregelung (AIC-C)–Ein Beitrag zur Steigerung des Komforts und der aktiven Fahrsicherheit" by Dorissen et al.; ATZ Automobiltechnische Zeitschrift 98 (1996); pp. 396–405.

Fuzzy Logic—Theorie und Praxis Bernd Reusch (Hrsg.); 3. Dortmunder Fuzzy–Tage Dortmund, 7–9 Juni 1993; Springer–Verlag.

* cited by examiner

Primary Examiner—William A. Cuchlinski, Jr.
Assistant Examiner—Edward Pipala
(74) Attorney, Agent, or Firm—Baker Botts L.L.P.

(57) ABSTRACT

A method and arrangement for controlling vehicle spacing produces driver-specific characteristic diagrams for vehicle speed and following time from which a mean target following time is determined. The characteristic diagrams are used to control the spacing of the vehicle from a vehicle in front of it.

12 Claims, 2 Drawing Sheets

METHOD AND ARRANGEMENT FOR CONTROLLING VEHICLE SPACING

BACKGROUND OF THE INVENTION

This invention relates to methods and arrangements for controlling the spacing between vehicles.

In methods for controlling the spacing of motor vehicles, the distance between a motor vehicle and a vehicle in front of it is controlled without any action by the driver by providing automatic control of the vehicle speed. For this purpose, a distance measuring arrangement emits directed electromagnetic waves such as laser or radar pulses which are reflected from the vehicle in front so that the spacing of the vehicle from a vehicle ahead and in the same lane is determined from the transit time of the pulses. The resulting vehicle spacing data are supplied to a control unit which controls the speed of the vehicle by accelerator or brake operation so that the distance from the motor vehicle in front matches a predetermined target spacing.

In conventional vehicle spacing control methods, the target distance is preassigned as a constant or corresponds to a defined safe distance which depends on the vehicle speed. With these arrangements it is not possible to vary the spacing from the vehicle in front depending, for example, on the traffic situation, or traffic density. For example, in heavy traffic, a shorter distance from the vehicle in front is often desirable in order to keep other vehicles from cutting in and thereby avoid the resulting braking of the vehicle but such spacing variation is not possible with conventional arrangements. Also, conventional arrangements cannot accommodate a driver's personal driving style, i.e. "sporting" drivers prefer a shorter distance from the vehicle in front and are skeptical of a distance control arrangement that fails to allow for this preference, whereas drivers with a "conservative" driving style choose to follow another vehicle with a greater margin of safety. In addition, there is a conventional spacing control method in which the driver can vary a preassigned target spacing by adjusting a potentiometer on the instrument panel. A disadvantage of this arrangement is that the driver must frequently manipulate an additional operating element, thus further burdening his task.

German Offenlegungsschrift No. 44 37 678 discloses a method in which the driver can establish a certain desired distance as the target distance as a function of speed by actuating the accelerator and/or the brake pedal. The selection of the desired spacing upon activation of the spacing control is accomplished when the driver, before activation of the spacing control, sets his individual desired distance, corresponding to the current speed of the vehicle, by using the accelerator or the brake pedal when following another vehicle. When the spacing from the vehicle in front corresponds to the spacing desired by the driver, the spacing control is activated by actuating a switch or operating lever, for example by actuating an operating lever on the steering wheel. The selection or variation of the desired spacing with the spacing control activated is accomplished by gradual actuation of the accelerator and/or the brake pedal to increase or decrease the spacing to another desired spacing. With the spacing control activated, the target spacing, depending on the preassigned desired spacing is determined as a function of the current vehicle speed. The target spacing as a function of vehicle speed and desired spacing may, for example, be plotted as a family of curves and stored in the control unit. Upon variation in the speed of the vehicle in front, and consequently the speed of the controlled vehicle, the target spacing is varied as a function of speed with the aid of the stored curves to maintain a corresponding following time. A disadvantage of this method is that, especially when setting the desired spacing upon activation, the vehicle operator commits himself for the ensuing period of time to that spacing reference or following time, which is then systematically followed according to the vehicle speed by way of the stored curves. But such spacing and following time values will not necessarily correspond to the individual's driving behavior so that the operator must continually correct the spacing using the brake or accelerator.

The publication "Abstandsregelung von Fahrzeugen mit Fuzzy-Control" (Spacing Regulation for Vehicles with Fuzzy Control), *Tagungsband der 3. Dortnunder Fuzzy-Tager*, Current Data-Processing Series, Springer 1993, discloses the determination of a spacing model depending on the type of driver and the weather conditions instead of using a fixed preassigned target spacing. The type of driver is ascertained by an external sensing system but there is no provision for dependable automatic recognition of the driver type.

SUMMARY OF THE INVENTION

Accordingly, it is an object of the present investigation to provide a method and arrangement for controlling vehicle spacing which overcomes disadvantages of the prior art.

Another object of the invention is to provide a method and arrangement to control vehicle spacing that will automatically adapt to an individual driver's behavior.

These and other objects of the invention are attained by detecting and recording driver-specific pairs of values for current vehicle speed and following time from the vehicle in front (i.e. the spacing as a function of vehicle speed) when the vehicle spacing is being controlled by the driver to provide driver-specific characteristic diagrams, and thereafter automatically controlling the spacing in accordance the driver-specific characteristic diagrams.

When the driver sets a target spacing or following time for which there is as yet no characteristic diagram at the commencement of operation, because the number of characteristic diagrams recorded is not very large, the target following time setting is simply maintained.

For better adaptation to driver-specific behavior, other parameters that have an influence on the following time may also be used. For example the coefficient of friction of the driving surface may also be detected and recorded.

The driver-specific characteristic diagram may be simulated alphanumerically by key points or formulas, by fuzzy regulators, or by a neural network. Fuzzy controls and neural networks offer a better possibility of conversion especially when many parameters are taken into account that are difficult to interrelate by a formula.

In another preferred embodiment, several sets of characteristic diagrams are stored which are individually selectable by the driver. This takes account of the fact that a vehicle may be operated by several drivers, such as married couples, and also of the fact that the same driver may, according to circumstances, prefer different operating modes. Selection of the appropriate characteristic diagram for the target following time may be accomplished by an input unit or by way a driver identifying device such as a coded ignition key or the like. Further, it is possible for the system to compare the current operating mode of the driver with the stored characteristic diagrams and then select the appropriate diagram for automatic spacing control.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
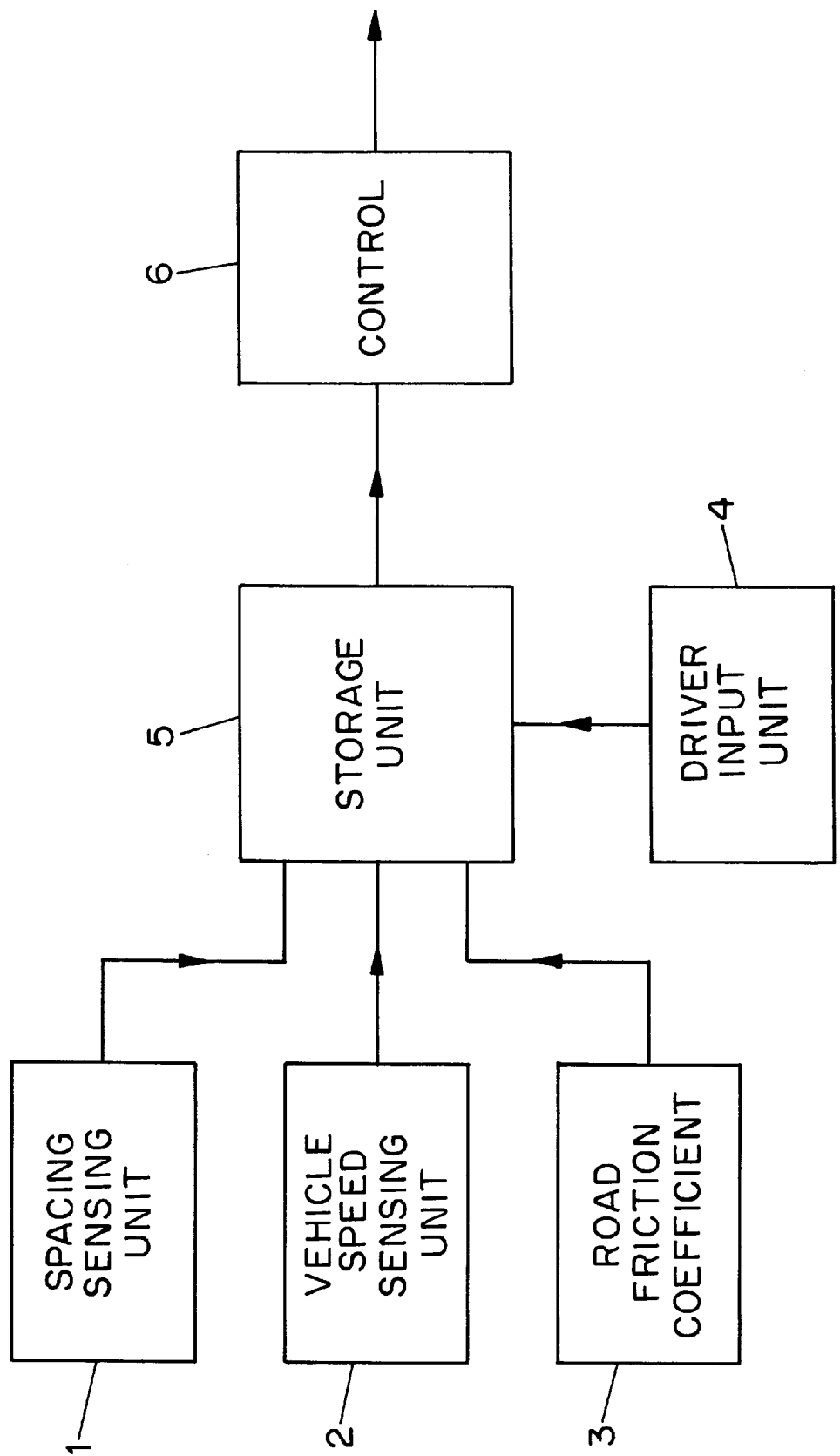
FIG. 1 is a schematic block diagram illustrating a representative embodiment of an arrangement for controlling vehicle spacing in accordance with the invention.
Figure 2:
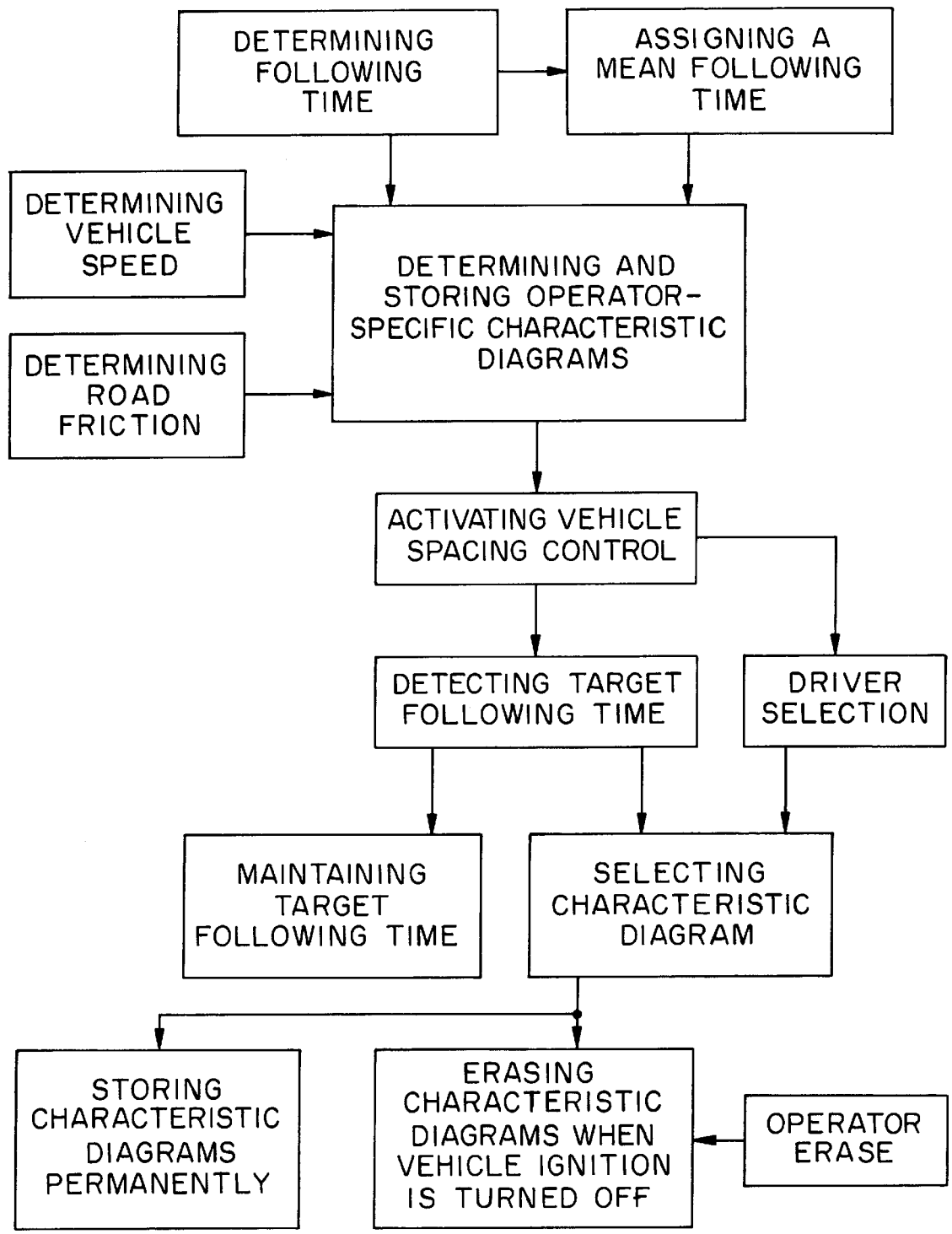
FIG. 2 is a diagram showing the steps involved in the method of the invention.

The typical embodiment of an arrangement for controlling vehicle spacing shown in the drawing include a spacing sensing unit 1, a vehicle speed sensing unit 2, a device 3 for determining a coefficient of road friction, a driver input unit 4, a storage unit 5 for plotting and storing characteristic diagrams, and a spacing control unit 6 for controlling the speed of the motor vehicle.

To adapt the control of the spacing from a vehicle in front to the operator's driving mode, with the spacing control unit regulation deactivated, the spacing sensing unit 1, the speed sensing unit 2 and the device 3 for detecting a coefficient of road friction all transmit data continuously or discretely to the storage unit 5 which compiles a driver-specific characteristic diagram based on the supplied data. For example, a characteristic diagram based on data showing a mean following time of 1.12 seconds is assigned a target following time of 1.1 seconds. The plurality of all such diagrams based on operation by an individual driver forms a driver-specific set of diagrams. If the driver then activates the vehicle spacing control arrangement by the driver input unit 4, he is prompted to put in a target following time, for which a characteristic diagram is then made available by the storage unit 5. This selected characteristic diagram is then followed by the control unit 6 which acts, for example, on the accelerator and the brake pedal to maintain the desired spacing. Thus, the control unit 6 maintains the spacing in accordance with the learned driving behavior of the vehicle operator.

Although the invention has been described herein with reference to specific embodiments, many modifications and variations therein will readily occur to those skilled in the art. Accordingly, all such variations and modifications are included within the intended scope of the invention.

I claim:

1. A method of controlling vehicle spacing wherein a target spacing from a vehicle in front of a controlled vehicle is determined by calculating the target spacing, at least as a function of the speed of the vehicle, comprising the following steps:
   a) determining the following time of the controlled vehicle from a vehicle in front according to the current vehicle speed at selected time intervals when the vehicle spacing is not being controlled automatically;
   b) determining and storing operator-specific characteristic diagrams from corresponding pairs of speed and following time values;
   c) assigning a mean following time value to each characteristic diagram;
   d) upon activation of vehicle spacing control, detecting an input of a target following time;
   e) after input of the target following time, selecting a corresponding characteristic diagram having a mean following time characteristic equal to the target following time from the set of characteristic diagrams; and
   f) maintaining the spacing from a vehicle in front by the vehicle spacing control in accordance with the selected characteristic diagram.

2. A method according to claim 1 wherein, in the absence of a corresponding characteristic diagram, the input target following time is maintained.

3. A method according to claim 1 wherein, for corresponding pairs of speed and following time values, a coefficient of road friction is determined and stored.

4. A method according to claim 1 wherein the characteristic diagrams are represented in the form at least one of: numeric diagrams; fuzzy controls; and neural networks.

5. A method according to claim 1 wherein the characteristic diagrams generated during operation are erased when the vehicle ignition is turned off.

6. A method according to claim 1 wherein characteristic diagrams are stored permanently.

7. A method according to claim 6 wherein individual characteristic diagrams may be selectively erased by an operator input unit.

8. A method according to claim 6 wherein a plurality of sets of characteristic diagrams are stored for driver selection.

9. A method according to claim 8 wherein a set of characteristic diagrams is selected by at least one of: a driver identification; and a comparison of characteristic diagrams with current driving behavior of the driver.

10. An arrangement for controlling vehicle spacing comprising a sensing unit for detecting the distance of a first vehicle from a vehicle ahead, means for detecting the first vehicle speed, an input unit for receiving data relating to the first vehicle, control means for controlling the speed of the first vehicle, storage means for generating and storing characteristic diagrams based on data supplied by the sensing unit and the speed detecting means, the input unit being arranged to select a stored characteristic diagram information for transmission to the control means and vehicle spacing control means for controlling the spacing of the first vehicle from the vehicle ahead in accordance with the selected characteristic diagram.

11. An arrangement according to claim 10 wherein the storage means for generating and storing characteristic diagrams comprises at least one of: a microprocessor; a fuzzy control; and a neural network.

12. An arrangement according to claim 10 further comprising means for determining a coefficient of road friction and supplying corresponding data to the storage means for generating and storing characteristic diagrams.

* * * * *